(12) United States Patent
Engelhardt

(10) Patent No.: US 6,754,003 B2
(45) Date of Patent: Jun. 22, 2004

(54) SCANNING MICROSCOPE AND METHOD FOR SCANNING A SPECIMEN

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 19 days.

(21) Appl. No.: 10/218,314

(22) Filed: Aug. 14, 2002

(65) Prior Publication Data

US 2003/0035208 A1 Feb. 20, 2003

(30) Foreign Application Priority Data

Aug. 14, 2001 (DE) .......................................... 101 39 920

(51) Int. Cl.[7] .......................... G02B 21/06; G02B 21/00
(52) U.S. Cl. ...................... 359/389; 359/385; 359/368
(58) Field of Search ................................ 359/368–390, 359/200–214

(56) References Cited

U.S. PATENT DOCUMENTS

| | | | |
|---|---|---|---|
| 4,515,439 A | | 5/1985 | Esswein ..................... 359/368 |
| 5,184,012 A | * | 2/1993 | Yamamoto ................... 250/234 |
| 5,612,818 A | * | 3/1997 | Kumagai et al. ............ 359/385 |
| 6,211,988 B1 | | 4/2001 | Engelhardt et al. ......... 359/201 |
| 6,580,518 B2 | * | 6/2003 | Eda et al. .................... 356/609 |

FOREIGN PATENT DOCUMENTS

| | | |
|---|---|---|
| DE | 3202461 | 6/1983 |
| DE | 19901219 | 9/1999 |
| DE | 19654210 | 4/2001 |
| JP | 63279213 | 11/1988 |
| JP | 2001091848 | 4/2001 |

* cited by examiner

Primary Examiner—Thong Q. Nguyen
(74) Attorney, Agent, or Firm—Davidson, Davidson & Kappel, LLC

(57) ABSTRACT

A scanning microscope possesses at least one illumination source for emitting an illuminating beam that is conveyed via a beam deflection device and an optical system to a specimen and scans the latter, the beam deflection device defining at least one illuminating beam rotation point. A device for axial displacement in particular of the beam deflection device, or of a lens preceding the objective, is provided for imaging of an image of the illuminating beam rotation point into the pupil of the objective.

18 Claims, 2 Drawing Sheets

SCANNING MICROSCOPE AND METHOD FOR SCANNING A SPECIMEN

CROSS REFERENCE TO RELATED APPLICATIONS

This application claims priority of the German patent application 101 39 920.0-42 which is incorporated by reference herein.

FIELD OF THE INVENTION

The invention concerns a scanning microscope and a method for scanning a specimen.

BACKGROUND OF THE INVENTION

In scanning microscopy, a specimen is illuminated with a light beam in order to observe the reflected or fluorescent light subsequently emitted by the specimen, laser beams usually being used for illumination. A specimen is scanned by means of a finely focused light beam. The focus of the illuminating light beam is moved in a specimen plane by means of a controllable beam deflection device which generally comprises two tiltable mirrors that move in one specimen plane. The deflection axes are usually perpendicular to one another, so that one mirror deflects the incident beam in the X direction and the other in the Y direction. Tilting of the mirrors is achieved, for example, by means of galvanometer positioning elements.

With the galvanometer technology usually used at present, the maximally achievable scanning rates are limited, because of the inertia of the moving mechanical components, to a few hundred Hz for nonresonant galvanometers and a few kHz for resonant galvanometers. This ultimately results in relatively long measurement times for each sample.

Furthermore, the galvanometers are generally several centimeters long, the (usually round) mirrors having a diameter of approx. one centimeter. Beam deflection about two axes requires at least two galvanometer mirrors one behind another or nested in gimbal fashion within one another. This galvanometer assemblage requires a great deal of room in the microscope. It has therefore also already been proposed to use a beam deflection device having micromirrors for scanning a specimen; this considerably increases the scanning speed and scan quality.

DE 196 54 210 therefore furthermore proposes a particular embodiment of the scanning unit with which an incident beam can be deflected by mirrors in the X and Y directions and guided over the specimen to be examined. The scanning unit is constituted by three rotatable mirrors. The first and the second mirror are arranged in a fixed angular position with respect to one another, and are rotated together. The third mirror is rotatable independently of the first and second mirrors. With this arrangement it is possible to ensure a high image rate while at the same time eliminating serious imaging defects.

In confocal scanning microscopy specifically, the specimen to be examined is scanned in three dimensions with the focus of a light beam. A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels through the beam deflection device back to the beam splitter, passes through it, and is then focused onto the detection pinhole behind which the detectors (usually photomultipliers) are located. Detected light that does not derive directly from the focus region takes a different light path and does not pass through the detection pinhole, so that a point datum is obtained which results, by sequential scanning of the specimen, in a three-dimensional image.

A three-dimensional image is usually achieved by acquiring image data in layers. Scanning of the specimen in the axial direction (Z direction) is usually accomplished by so-called "specimen scanning," in which the specimen is moved in the Z direction using the specimen stage. It can also be performed, however, by displacing the objective in the axial direction, which is accompanied by a shift in the focus of the illuminating beam.

The reflected or fluorescent light emitted from the specimen upon illumination travels via a beam splitter and through a detection pinhole to a detector. The power level of the light coming from the specimen is measured as a function of the position of the scanning beam, preferably at fixed time intervals. The specimen can thus be scanned in three dimensions one grid point at a time, and at each scan point a reading that is representative of that specimen point can be ascertained.

The lasers usually used as illumination sources in scanning microscopes allow optimum illumination of the specimen in order to obtain the desired result. One important aspect regarding the quality of a scanning microscope is precise imaging of the rotation point of the beam deflection device into the pupil of the objective being used. In the case of beam deflection devices that, because of their geometry, have more than one rotation point, adaptation of the imaging in terms of image quality should be optimally adjustable. But because the location of the pupil depends on the one hand substantially on the objective being used and on the other hand on the wavelength of the illuminating beam, known microscopes do not offer a satisfactory solution to this problem. The illuminating beam is therefore mostly not tilted in the Pupil of the objective which leads to unwanted aberrations cause of non telecentric imaging.

SUMMARY OF THE INVENTION

It is therefore the object of the present invention to propose a scanning microscope which avoids the mentioned aberrations especially at different wavelength.

According to the present invention, this object is achieved by a scanning microscope comprising:
- an illumination source for generating an illuminating beam;
- a beam deflection device that defines at least one illuminating beam rotation point for deflecting the illuminating beam,
- a means for imaging the illuminating beam rotation point,
- an objective that defines at least one pupil,
- a device for axial displacement of an image of the illuminating beam rotation point into the at least one pupil of the objective.

It is a further object if the invention to propose a method, which allows to scan a specimen especially at different wavelength and which avoids the problems of non telecentric imaging.

This object is achieved by a method for scanning a specimen with a scanning microscope comprising the steps of:

Generating an illuminating beam with an illumination source,

Transferring the illuminating beam to a beam deflection device that defines at least one illuminating beam rotation point, Imaging an image of the illuminating beam rotation point, Focusing the illuminating beam onto the specimen with an objective that defines at least one pupil, Displacing the image of the illuminating beam rotation point into the at least one pupil of the objective with a device for axial displacement of the image of the illuminating beam rotation point.

The scanning microscope according to the present invention thus comprises an illumination source with which the illuminating radiation necessary in the scanning microscope is generated. Advantageously, a laser is used to generate the illuminating beam. With the beam deflection device present in the scanning microscope, it is possible to deflect the illuminating beam line by line, i.e. in the X and Y directions, so that the specimen to be examined can be scanned. This beam deflection device defines, at the deflection points, an illuminating beam rotation point. The illuminating beam rotation point is the virtual intersection point of the deflected illuminating beams. In order to influence the imaging of this illuminating beam rotation point, a device for axial displacement of an image of said illuminating beam rotation point into the pupil of the object is provided. With the use of the device according to the present invention for axial displacement, it is possible to adapt the location of the image of the illuminating beam rotation point to the particular objective and illuminating beam wavelength being used. This adaptation results in substantially perpendicular imaging of the illuminating light beam through the objective onto the specimen, since imaging of the illuminating beam rotation point into the pupil of the objective guarantees that even with line-by-line scanning, the illuminating beam is directed substantially perpendicularly onto the specimen at every point. In addition, with the microscope according to the present invention it is possible to use different illuminating wavelengths, since the difference in location (already described above) of the pupil at different illuminating beam wavelengths can be compensated for with the scanning microscope according to the present invention.

In a preferred embodiment of the invention, the device for axial displacement of the image of the illuminating beam rotation point is coupled to the beam deflection device itself. Advantageously, the beam deflection device is combined for that purpose into a module which is equipped with the aid of a manually adjustable mechanism or in motorized fashion can be modified in terms of its axial location in such a way that the image of the illuminating beam rotation point can be placed in the pupil of the objective. The device for axial displacement of the image of the illuminating beam rotation point is in a preferably embodied in such a way that a substantially continuous or stepwise displacement of the components to be displaced of up to 30 mm from their basic position is possible.

In a further preferred embodiment, however, lenses present in the microscope that are arranged in front of the objective and modify the focal length can also be equipped with a mechanism that modifies their axial position. With this as well, the respective lenses or even an entire lens system can be positioned in such a way that the image of the illuminating beam rotation point is imaged in the pupil of the objective. The properties of the particular objective and illuminating beam wavelength being used are taken into account in this context.

In a further embodiment, the entire scanning unit which substantially contains the illumination and detection pinholes, the main beam splitter, the beam deflection device, the detector, and certain optical systems for shaping and guiding the light beams—can be displaced in such a way that the image of the illuminating light beam rotation point is imaged into the pupil of the objective (or at least into the vicinity of the pupil).

To allow this adjustment operation to be performed conveniently and easily, the pupil locations for each of the objectives and for the illuminating wavelengths used in the microscope must each be known. These can, for example, be determined in a previous working step for the various objectives and wavelengths used, and stored in a memory unit in the microscope. Advantageously, however, the manufacturer's data are used. It is thereby possible to automate the operation of adjusting the axial displacement. For automatic adjustment, it is necessary merely to know the objective being utilized and the illuminating beam wavelength that is in use. From the data stored for the specific combination of objective and illuminating beam wavelength, the particular position required for the beam deflection device, scanning unit, or axially displaceable lenses can then be ascertained. A displacement travel is then determined by comparing the present position to the setpoint position, and the device for axial displacement is then activated so that the desired displacement occurs.

With the scanning microscope according to the present invention and the method according to the present invention for scanning a specimen it is thus possible to make a contribution toward automating the adjustment operation; this on the one hand reduces the error rate and on the other hand shortens the setup time prior to operational readiness of the microscope.

BRIEF DESCRIPTION OF THE DRAWINGS

Further advantages and advantageous embodiments of the invention are evident from the Figures below and their description, correctly scaled reproduction in the depiction of the Figures having been dispensed with in the interest of clarity.

Specifically.

DETAILED DESCRIPTION OF THE INVENTION

Figure 1:
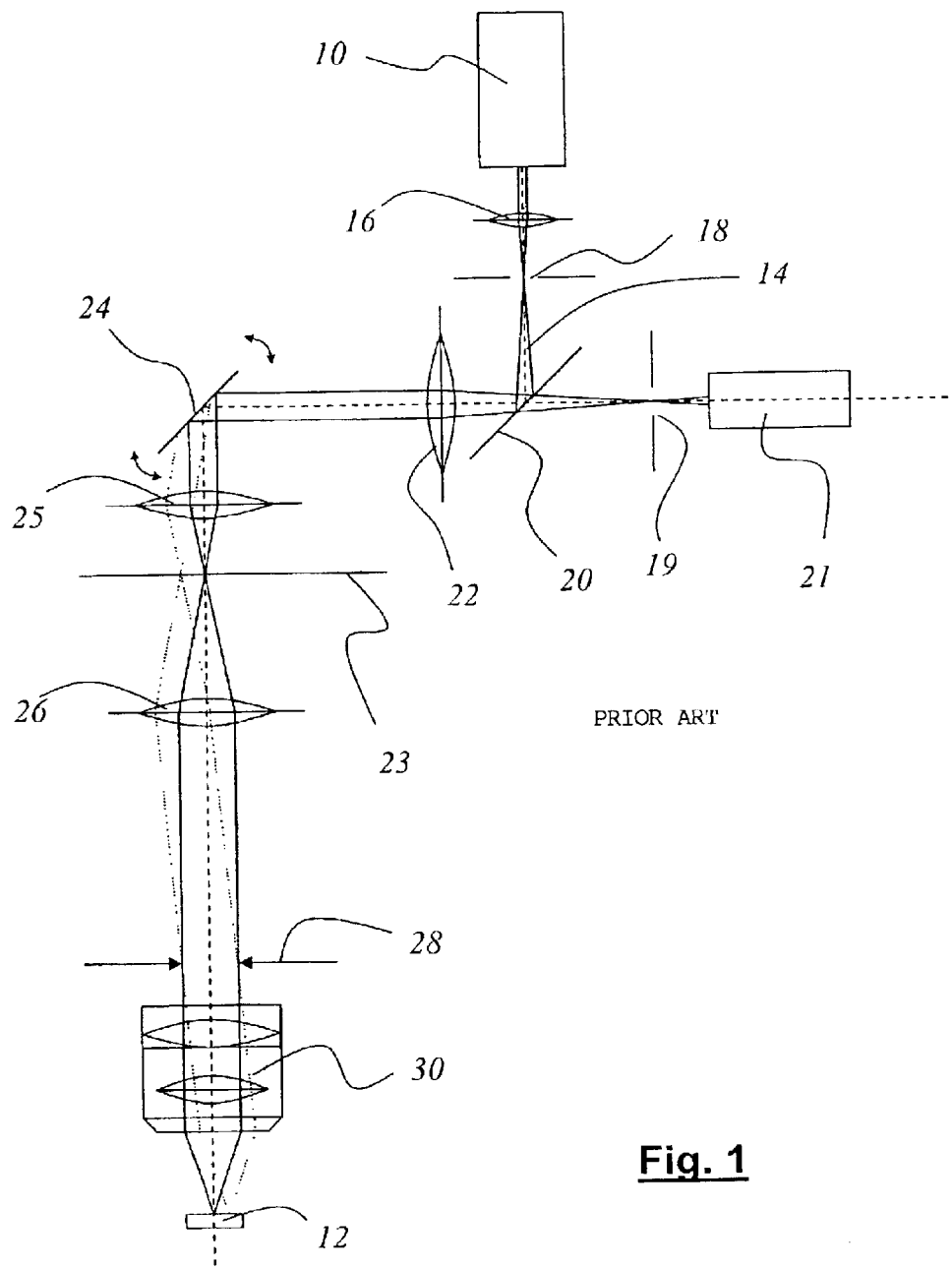
FIG. 1 is a schematic depiction of a conventional scanning microscope.

FIG. 1 schematically depicts a conventional confocal scanning microscope having an illumination source 10 in the form of a laser for generating an illuminating light beam 14 to illuminate a specimen 12.

Arranged in the beam path after illumination source 10 is an optical system 16 with which the light of light source 10 is focused onto an illumination pinhole 18. After illumination pinhole 18, illuminating light beam 14 arrives at a beam splitter 20 which directs illuminating light beam 14 through an optical system 22 onto a beam deflection device 24.

Optical systems 25 and 26 are arranged after beam deflection device 24. Illuminating light beam 14 then travels through objective 30 onto specimen 12. In this example, the axial location of pupil 28 is above the objective and is indicated with two arrows.

A detector 21 arranged after a detection pinhole 19 serves to detect the detected or fluorescent light. An intermediate image plane 23 is formed between optical systems 25 and 26.

Figure 2:
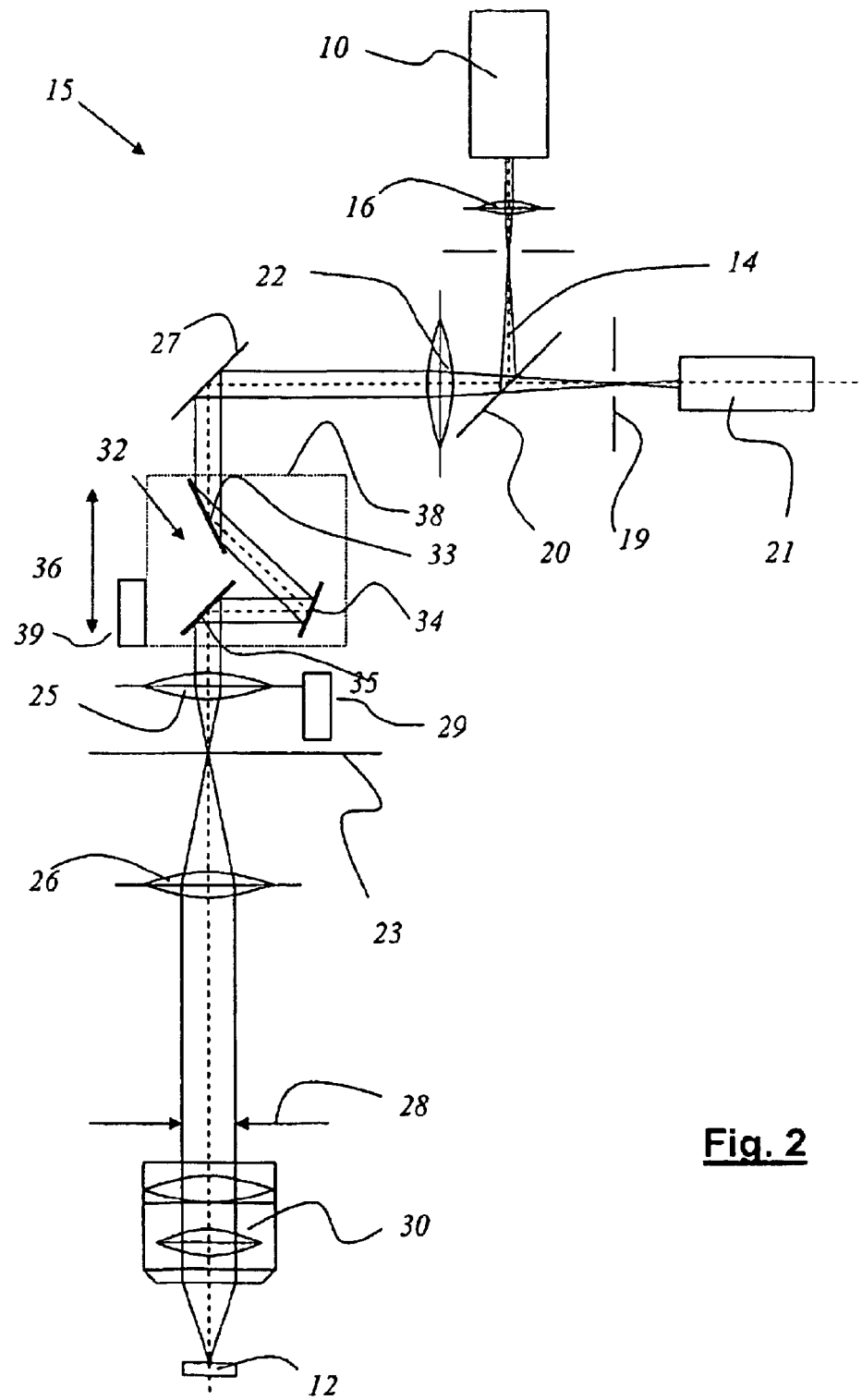
FIG. 2 shows the general construction of a scanning microscope having an axial displacement device.

FIG. 2 shows the general construction of a scanning microscope according to the present invention. Once again, an illuminating light beam 14 proceeds from an illumination source 10 and is conveyed via a deflection mirror 27 to a beam deflection device 32. Beam deflection device 32 is capable of causing a line-by-line motion of illuminating light beam 14 so that with that motion, a line-by-line scan of specimen 12 can be performed. The location of pupil 28 is determined by the particular objective 30 used and by the wavelength of illuminating light beam 14 that is utilized. In beam deflection device 32, mirror combination 33, 34, 35 defines an illuminating beam rotation point that must be imaged into pupil 28.

In the present embodiment of the invention, this can be achieved by the fact that beam deflection device 32 is coupled to a device 39 for axial displacement of the image of the illuminating beam rotation point into pupil 28 (or at least into the vicinity of the pupil), beam deflection device 32 being, for example, combined as module 38. Said device 39 can, in particular, be coupled to beam deflection device 32 in such a way that the entire module 38 can be displaced in axial motion direction 36. In an embodiment, beam deflection device 32 includes a scanning unit having mirrors for deflecting an incident beam in the X and Y directions and guided over the specimen to be examined. The scanning unit is constituted by three rotatable mirrors. The first and the second mirror are arranged in a fixed angular position with respect to one another, and are rotated together. The third mirror is rotatable independently of the first and second mirrors. With this arrangement it is possible to ensure a high image rate while at the same time eliminating serious imaging defects.

In order to ascertain the displacement travel required in axial motion direction 36, the location of pupil 28 must be known. It can, for example, be ascertained beforehand for different objectives 30 and stored. For the different objectives, the ascertained pupil locations 28 are preferably stored in a memory associated with the microscope, for example in the form of a table. In order to allow different objectives to be used in the microscope, it is already known to arrange the objectives on a rotatable disk, called a revolving turret, and to rotate the particular desired objective into a working position in the beam path. As is known, the objectives can be equipped with a code in order to ascertain the type of objective. If the information as to the pupil associated with the particular objective is already stored in the table, it is possible to assign the respective location of pupil 28 simply by rotation of the objective into the beam path and by automatic recognition of that objective.

If the location of the pupil for each objective is furthermore stored, in this or a further table, additionally as a function of the illumination wavelength, it is then easily possible to automate the adjustment operation with respect to pupil location. The only input that then needs to be requested from the user is input of the illumination wavelengths being used. With the scanning microscope according to the present invention, it is thus possible to determine the required displacement travel in the axial direction as a function of the particular objective and illumination wavelength being used. This can be done, in particular, by ascertaining the present position of the element to be displaced, i.e. for example beam deflection device 32. Firstly the present position of beam deflection device 32 is determined, or is read out from a memory region. Then the setpoint position of the beam deflection device is ascertained, taking as the basis the particular objective 30 and illumination wavelength being used. From the difference between these setpoint and actual values, the required axial displacement travel of beam deflection device 32 in motion direction 36 is obtained.

Practical experience has shown that displacements of up to 30 mm are necessary in this context. The device for axial displacement of beam deflection device 32 must therefore be capable of guaranteeing exact displacement of beam deflection device 32 over that range.

In an alternative embodiment of the invention, it is of course also possible to displace one of lenses 25 or 26, or a corresponding lens system, in the axial direction in such a way that the image of the illuminating beam rotation point is imaged into the pupil of the objective. Axial displacement device 29 is used to accomplish the displacement of lens 24 or 26. This displacement, like the displacement of beam deflection device 32 described above, is once again based on the pupil location in accordance with objective 30 being used and in accordance with the wavelength of illuminating light beam 14 being utilized. The lenses 25 or 26 or the lens combination that is to be displaced is coupled to the displacement device 29, for example, via a housing or a carrier for the lenses.

It is of course also possible, in similar fashion, to perform a displacement of the entire scanning unit 15 in order to adapt the imaging of the illuminating light beam rotation point into, or into the vicinity of, the axial location of pupil 28.

With the arrangement according to the present invention, especially as described with reference to the Figures, it is now possible to compensate for the fluctuating pupil location that occurs in particular when different objectives of various magnifications are used in turn. The device for axial displacement can be embodied in such a way that stepwise displacement or continuous displacement of beam deflection device 32, scanning unit 15, or lenses 25, 26 is possible.

It is furthermore possible, of course, to use apparatuses for correcting the image size in addition to the device for displacement.

The invention has been described with reference to a particular exemplary embodiment. It is nevertheless self-evident that changes and modifications can be made without thereby leaving the range of protection of the claims below.

What is claimed is:

1. A scanning microscope comprising:
   an illumination source for generating an illuminating beam;
   a beam deflection device that defines at least one illuminating beam rotation point for deflecting the illuminating beam,
   a means for imaging the illuminating beam rotation point,
   an objective that defines at least one pupil,
   a device for axial displacement of an image of the illuminating beam rotation point into the at least one pupil of the objective as a function of a wavelength of the illuminating beam.

2. The scanning microscope as defined in claim 1, wherein the device for axial displacement of the image of the illuminating beam rotation point is coupled to the beam deflection device in such a way that the latter is axially displaceable.

3. The scanning microscope as defined in claim 2, wherein the beam deflection device is combined into a module; and the device for axial displacement the one illuminating beam rotation point is coupled to the module.

4. The scanning microscope as defined in claim 1, wherein the device for axial displacement of the image of the illuminating beam rotation point is coupled to at least one lens, which precedes the objective, in such a way that the lens is axially displaceable.

5. The scanning microscope as defined in claim 1, wherein the device for axial displacement of the image of the illuminating beam rotation point is coupled to the means for imaging the illuminating beam rotation point, in such a way that the means for imaging is axially displaceable.

6. The scanning microscope as defined in claim 1, wherein the device for axial displacement of the image of the illuminating beam rotation point displaces the image of the illuminating beam rotation point substantially continuous or stepwise within a range of up to 30 mm.

7. The scanning microscope as defined in claim 1, wherein the scanning microscope is a confocal scanning microscope.

8. The scanning microscope as defined in claim 1, wherein the device for axial displacement of the image of the illuminating beam rotation point is adjustable as a function of the objective and the wavelength of the illuminating beam.

9. The scanning microscope as defined in claim 1 further comprising a memory device having stored thereon a location of the at least one pupil as a function of a wavelength of the illuminating beam.

10. A method for scanning a specimen with a scanning microscope comprising the steps of:

Generating an illuminating beam with an illumination source,

Transferring the illuminating beam to a beam deflection device that defines at least one illuminating beam rotation point, Imaging an image of the illuminating beam rotation point, Focusing the illuminating beam onto the specimen with an objective that defines at least one pupil, Displacing the image of the illuminating beam rotation point into the at least one pupil of the objective with a device for axial displacement of the image of the illuminating beam rotation point, and determining a location of the at least one pupil as a function of the wavelength of the illuminating beam.

11. The method as defined in claim 10, wherein the axial displacement of the image of the illuminating beam rotation point is accomplished by way of an axial displacement of the beam deflection device.

12. The method as defined in claim 10, wherein the axial displacement of the image of the at least one illuminating beam rotation point is accomplished by way of an axial displacement of at least one lens preceding the objective.

13. The method as defined in claim 10, wherein the scanning microscope contains a scanning unit, and the axial displacement of the image of the at least one illuminating beam rotation point is accomplished by way of an axial displacement of the scanning unit.

14. The method as defined in claim 10 further comprising the step of:

correcting the image size.

15. The method as defined in claim 10, wherein the location of the at least one pupil as a function of the wavelength is determined from a table.

16. The method as defined in claim 10 further comprising determining the location of the pupil as a function of the objective.

17. The method as defined in claim 16 further comprising storing the location of the pupil as a function of the objective.

18. The method as defined in claim 10, wherein the displacing the image of the illuminating beam rotation point is performed as a function of the objective and the wavelength of the illuminating beam.

* * * * *